Patented Dec. 17, 1935

2,024,895

UNITED STATES PATENT OFFICE 2,024,895

POULTRY LICE EXTERMINATOR

Arthur H. Teigen, Madison, Wis., assignor to Pratt Food Company, a corporation of Pennsylvania No Drawing. Application May 27, 1931, Serial No. 540,503

2 Claims. (Cl. 167—34)

The subject of my invention is a non-volatile, sticky, adherent fluid of high viscosity containing free nicotine or a nicotine derivative, such as nicotine sulphate, and a carrier, such as an oil. By the use of a suitable carrier a small amount of nicotine may be used and because of its sticky, adherent character it is retained on the perches and on the feathers of the birds where it acts to destroy any insect pests, such as commonly infest poultry.

It has been known heretofore to spread or spray poultry houses and perches with a solution of nicotine or nicotine sulphate in water. The water rapidly evaporates from this solution and also the solution penetrates into the surface of the poultry houses and roosts or perches and also is readily absorbed by the dust and dirt on the surface of the houses and roosts. It is, therefore, necessary to use a concentrated solution and a large amount of the solution. Due to my invention by the use of a suitable carrier I am enabled to use a smaller amount of the nicotine or nicotine sulphate or other nicotine derivative and to retain it for a long time on the surface of the hen houses and on the feathers of the birds.

I may prepare my insecticide in several ways. When I intend to use free nicotine I mix it in the cold with a suitable, compatible carrier. Examples of such carriers are oils, glycerine etc. Free nicotine is normally a liquid and is miscible with these carriers and forms a solution with them or one of them. As a preferred formula I use:—

| | Percent |
|---|---|
| Free nicotine | 5 |
| Corn oil | 95 |

I may, however, prefer to use any derivative of nicotine, such as, for example, nicotine sulphate. To easily apply compositions of nicotine or nicotine derivatives such as those outlined above according to the formula given as example I usually prefer to use a small amount of volatile fluid as part of the formula.

A second method of preparing my insecticide is to emulsify free nicotine or its derivatives, such as nicotine sulphate, with suitable compatible carriers, such as those mentioned above, by the use of a proper emulsifying compound. In such a method, for example, nicotine sulphate can be used in oil by emulsifying it in the oil by the use of a proper emulsifying compound.

Having prepared an insecticide according to the above formula, the result is a non-volatile, sticky adherent fluid. A convenient method of using this insecticide is to place it on the inner walls of the poultry houses or on the roosts or perches therein. Due to its sticky adherent character the insecticide is retained on the surface to which it is applied and does not soak or become absorbed into the surface. Also due to its sticky character the insecticide readily becomes smeared or attached to the feathers of the birds and is retained thereon for long periods of time.

In the above specification and in the annexed claims the word "nicotine" is used to include free nicotine and its derivatives, such as nicotine sulphate.

I do not intend to be limited in the practice of my invention save as the scope of the prior art and of the attached claims may require.

I claim:

1. An insecticide for use on poultry perches, said insecticide being a non-volatile, sticky, adherent fluid containing free nicotine and corn oil.

2. An insecticide for use on poultry perches, said insecticide being a non-volatile, sticky, adherent fluid containing 5% free nicotine and 95% corn oil.

ARTHUR H. TEIGEN.